United States Patent [19]

Ninomiya et al.

[11] 4,266,754
[45] May 12, 1981

[54] BUTTERFLY VALVE ASSEMBLY

[75] Inventors: Youichi Ninomiya; Hirotoshi Ogawa; Tomoyuki Ueda; Masataka Machida, all of Nobeoka, Japan

[73] Assignee: Asahi Yukizai Kogyo Co., Ltd., Nobeoka, Japan

[21] Appl. No.: 102,919

[22] Filed: Dec. 12, 1979

Related U.S. Application Data

[63] Continuation of Ser. No. 868,292, Jan. 10, 1978, abandoned.

[30] Foreign Application Priority Data

Apr. 1, 1977 [JP] Japan ................................. 52-36077
Apr. 19, 1977 [JP] Japan ................................. 52-44121

[51] Int. Cl.³ ............................................. F16K 1/226
[52] U.S. Cl. ..................................... 251/306; 137/375
[58] Field of Search ......................... 251/306; 137/375

[56] References Cited

U.S. PATENT DOCUMENTS

| | | | |
|---|---|---|---|
| 3,241,806 | 3/1966 | Snell, Jr. ............................... | 251/306 |
| 3,341,170 | 9/1967 | Housworth ........................... | 251/306 |
| 3,420,498 | 1/1969 | Housworth ........................... | 251/306 |
| 3,425,439 | 2/1969 | Duffey et al. ........................ | 251/306 |
| 3,473,784 | 10/1969 | Radford ............................... | 251/306 |
| 3,784,157 | 1/1974 | Wenglar ............................... | 251/306 |
| 3,837,620 | 9/1974 | Malloy et al. ........................ | 251/306 |
| 4,014,511 | 3/1977 | Uno ...................................... | 251/306 |
| 4,025,050 | 5/1977 | Manki et al. ......................... | 251/306 |
| 4,133,513 | 1/1979 | Meyer .................................. | 251/306 |

*Primary Examiner*—Martin P. Schwadron
*Assistant Examiner*—H. Jay Spiegel
*Attorney, Agent, or Firm*—Armstrong, Nikaido, Marmelstein & Kubovcik

[57] ABSTRACT

The invention relates to a butterfly valve assembly having a stationary valve body formed with an axial fluid flow passage opening and a turnable valve member adapted for full opening, partial opening and full closing of the said passage opening. There is provided further a valve seat ring composed of an inner protecting layer of fluoride containing resin and an outer back-up layer of rubber or its equivalent. According to this invention, at least two parallel ring grooves are provided on the radially outwardly directing surface of the said elastomer layer which has a substantially channel-shaped cross-section embracing a substantial part of the valve body when the valve seat ring is attached in position to the valve body. Further, each of both chords of the channel in its cross-section are oppposingly bulged out inwardly at the both ends of each channel chord for creating and maintaining each a tongue-and-recess mode intimate connection between the valve body and the elastomer layer, when the valve seat ring is attached to the valve body. Still further, a small idle gap is formed in each of the inner corners of the channel for receiving occasional and radial physical deformation of the elastomer layer caused by repeated operation of the valve member.

5 Claims, 6 Drawing Figures

FIG. 5
FIG. 6
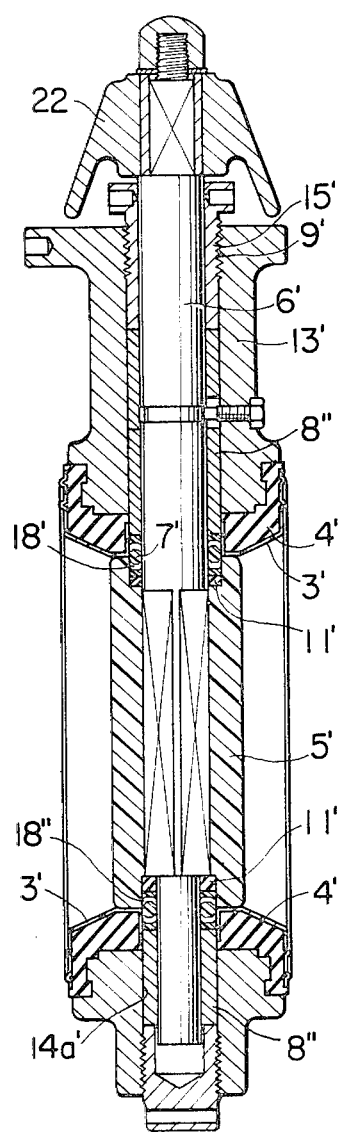
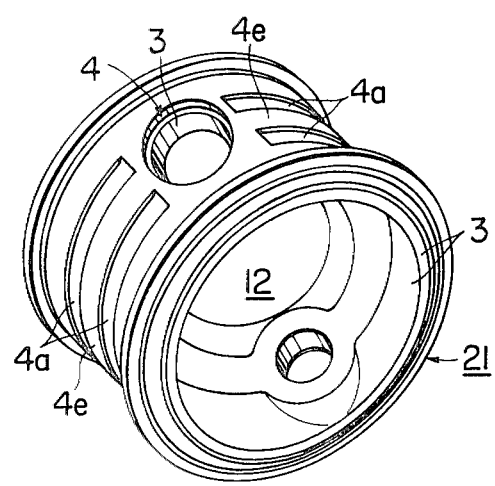

BUTTERFLY VALVE ASSEMBLY

This is a continuation of application Ser. No. 868,292, filed Jan. 10, 1978, now abandoned.

BACKGROUND OF THE INVENTION

This invention relates to improved butterfly valves, having improved anticorrosive and pressure-resisting performances.

In order to improve the anticorrosive and pressure-resisting performances of the butterfly valve, it has been already proposed to provide a protecting layer on the fluid-contacting surfaces of the valve member as well as the valve body, the said layer being composed of fluoro-resin. In addition, there is provided a back-up intermediate elastic material layer between the protecting layer and the inside surface of the valve body per se, so as to improve the tightly contacting performance between the valve member and the valve body, thereby attaining an improveness in the pressure-resisting performance of the valve assembly. The both layers are united in practice into one piece which is attached reseparably to the inside surface of the valve body. This piece may be called "valve seat member" (refer to Japanese Patent Publication Sho-45-13307).

There is a further proposal to prevent fluid leakage from around the valve stem by provision of one piece of cup seal ring or of a stack of sealing rings so as to effectively seal off the relatively sliding surfaces of the stem and the valve body (refer to, for instance, Japanese Patent Publication Sho-46-15585).

As the fluoro-resin used for the lining material in the conventional butterfly valves, polytetrafluoride ethylene, hereinafter to be described briefly as PTFE, is predominantly utilized. On the other hand, as the material of the elastomer composing the said intermediate back-up layer, natural rubber or synthetic rubber is predominantly utilized. The term "intermediate" as used herein throughout the specification and the appended claims denotes as such, when the valve body per se and the valve seat member have been assembled together to constitute the valve body.

While the material: PTFE represents superior anticorrosive performance, it shows a rather high rate of gas permeability. Therefore, when such butterfly valves as covered by this substance are used in gaseous fluid pipe lines, such as those for conveying gaseous chlorine, the gas will so liably penetrate from inside through the protecting layer into its backup intermediate layer that the elastomer substance composing the latter may easily lose its elasticity, thereby the pressure-resisting and sealing function of the valve becoming soon defective.

With use of such conventionally and insidely covered butterfly valves, it has been further experienced that upon repeated on-off operation of the valve, the resilient back-up intermediate layer material will liably shift off from position on the inside surface of the valve body.

Another problem has been met with the inside covered butterfly valves such that on account of high pressure used in the assembly of the valve body elements, acting substantially on the mating flanges thereof, the elastomer material of the intermediate back-up layer of the valve seat ring, especially those existing in close proximity to these flanges will be subjected to a radially inwardly directing bulging. In extreme cases, these bulges will be transformed into inwardly convexed ridges which, when formed in reality, will destroy the tight fitness between the valve seat ring, especially the elastomer layer thereof, on the one hand, and the valve body per se, on the other. On the other hand, these bulge-out ridges will give rise to a locally concentrated severe wear on the inside valve body surface which is adapted for cooperating with the valve member. This drawback, when appearing, will substantially decrease the pressure-resisting performance of the valve assembly.

It has been further found that such deformation and/or positional shift of the elastomer layer will affect occasionally upon the sealing effectiveness at each end of both ends of the valve stem, thereby a fluid escapement through such defective sealed portions being disadvantageously encountered. According to our practical experience, such sealing loss as of the above kind can not be prevented completely even if the conventional cup type sealing ring(s) or vee seals be utilized. It has further been experienced that with use of these conventional cup type sealing rings at the ends of the valve stem, a functional defect will be rather rapidly encountered on account of severe wear appearing at the mutually rotating parts of the valve including the valve stem.

SUMMARY OF THE INVENTION

It is, therefore, the main object of the present invention to provide an improved butterfly valve assembly which can obviate substantially the aforementioned conventional drawbacks and can provide a high grade of anticorrosive performance as well as pressure-resisting ability for an extended use of the valve.

For attaining this object and according to the present invention, the innermost protecting layer of lining of the valve seat member is composed of polyvinylidene difluoride (to be briefly called PVDF hereinafter) which provides a high antipermeable performance, while the protecting layer or lining on the valve member is composed of PTFE, so as to completely protect the back-up elastomer and to preserve the desired smoothly slidable cooperation between these two main valve elements. In addition, the elastomer layer takes such specific structure and configuration as to prevent physical permanent deformation of the elastomer and to ensure permanently tight fitting between this layer and the valve body per se. By adopting these measures, the specifically selected material: PVDF which is rather harder, can be utilized as the material for the valve body protecting layer. In this way, the desirous smoothly sliding performance can be assured in the on-off cooperation of the valve member and the valve seat.

Briefly, the butterfly valve according to this invention relates to such a type that those surfaces of valve elements which are adapted for contacting the fluid to be controlled, are lined with fluoro-resin and that the protecting resin layer of the valve seats to be attached tightly onto the inside surface of valve body per se is backed up by an intermediate elastomer layer applied thereonto and to constitute jointly the valve seat ring.

As a characterizing feature, there are provided two parallel ring grooves formed on the outer surfaces of the elastomer layer of the valve seat ring and at the both sides of the tightly and closisely contacting central portion of the complete valve body when seen substantially in any radial cross-section thereof, with the movable valve member. In this respect, however, exception is made in proximity to the valve stem-penetrating portions. The purpose will be described later in detail with reference to the drawings.

The cross-section of the elastomer layer takes substantially a channel and the said pair of ring grooves are formed in the inner bottom thereof. The end extremeties of the both channel chords are bulged inwardly out and in opposition to each other and the corresponding parts of the wall of valve body per se are recessed, thereby to provide tight and intimate tongue-and-groove connections therebetween.

The inside corners of the channel are again bulged out inwardly and in opposition to each other and the corresponding parts of the valve body per se are also recessed, thereby to provide a substantially corresponding ridge-and-groove connections therebetween. In this case, however, a small idle gap is formed in each inside corner of the channel. The purpose thereof will be later fully described with reference to the drawings. Thus, the elastomer channel embraces the valve body per se from inside and both sides of the valve. The outer exposed surface of the elastomer channel is wholly covered with the said insidemost protecting layer. The valve member is made of or covered with PTFE while the body is covered with PVDF. In this way, a superior sliding performance therebetween can be assured.

Since PVDF represents a rather poor sliding performance, the valve body only is protected by this material, and indeed, with the intermediary of the intermediate back-up elastomer layer, thereby assuring a satisfying protection against gas corrosion. On the other hand, the movable valve member is made of or coated exclusively with PTFE for the purpose of assuring a satisfying sliding performance.

The gas permeability of PVDF is rather smaller than that of PTFE, amounting to about 1/250 with oxygen and to about 1/200 with nitrogen, based upon the gas permeability of the latter. Therefore, even with a thiner layer of the former, the deterioration of the elastomer substance by occasional invasion of a corrosive gas or gases can be effectively avoided.

On the other hand, PVDF has comparative performances of antichemical characteristics and heat resistance with those of PTFE and thus, limitation to its practical use is only small.

The hardness of PVDF is higher than PTFE, but the former can be used in the form of a thinner layer on account of its lesser rate of gas permeability, and indeed, through the intermediary of the elastomer layer which can be utilized fully and effectively, by selecting specifically its structure and configuration, as will be more fully described with reference to the drawings.

The PVDF-layer can be provided easily and economically when relying upon the powder baking and molding process.

Since, as was referred to hereinbefore, the PVDF-layer per se represents a rather poor elasticity, and thus, the thickness of the layer must have a small value, yet it is backed up with the elastomer layer having a specifically selected configuration, for the purpose of attaining satisfying sealing effect with cooperation of the movable valve member. The back-up elastomer layer may be composed of natural or synthetic rubber. At the latter, chloroprene rubber or silicon rubber may preferably be utilized, upon being vulcanized to a proper hardness. The PVDF-layer is prefabricated in a separate mold and coated on its joining surface with a thermosettable resin. Then, it is united in a second mold by supplying a flowing rubber material and vulcanization thereof.

This and further objects, features and advantages will become more apparent when read the following detailed description of preferred embodiments of the invention, and with reference to the accompanying drawings.

BRIEF DESCRIPTION OF THE DRAWINGS

FIG. 5 is an sectional elevation thereof, having been taken along a sectional plane perpendicular to the drawing plane of FIG. 4; and FIG. 6 is an enlarged perspective view of the valve seat member taken out from the first embodiment, wherein, however, the axial length thereof having been exaggerated to a some extent.

DETAILED DESCRIPTION OF THE INVENTION

Figure 1:
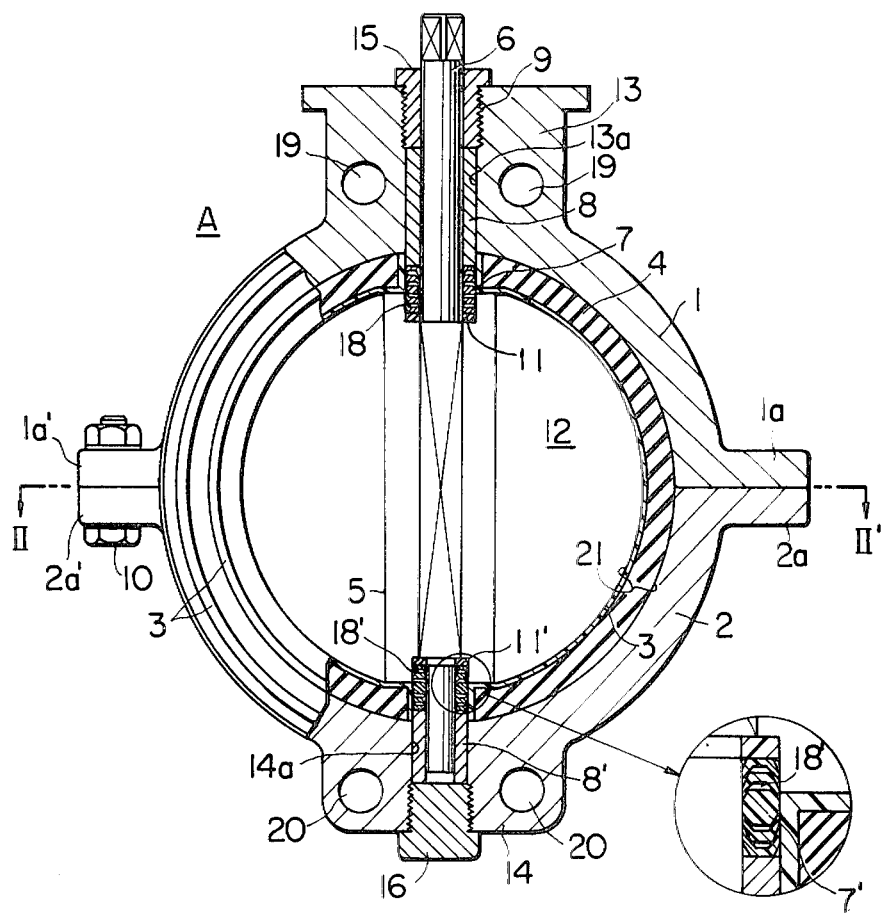
FIG. 1 is an axial and longitudinal section, yet partially representing an elevation, of the first embodiment of the present invention.

Now reference to FIGS. 1 and 2, the first embodiment of the butterfly valve will be described in detail.

The valve body per se A comprises two body halves 1 and 2 which have mating flanges 1a and 2a and 1a' and 2a', respectively, as shown. The body halves 1 and 2 are detachably united together by means of a plurality of fixing bolts and nuts which are shown only one representatively at 10 in FIG. 1.

When seen in its assembled state, the valve assembly represents a large hollow cylindrical bore 12 which serves as the passage way for preferably gaseous medium, the on-off or flow rate of the fluid being controlled by the present valve assembly.

The surface of the passage bore 12 is defined by a protecting lining layer 3 of PVDF backed up by the intermediary of an elastic intermediate layer 4. These layers 3 and 4 are attached firmly with each other to provide a unitary valve seat member 21 prefabricated by the powder baking and molding technique. The valve seat member 21 is tightly, but detachably mounted on the inside surface of the valve body per se A.

The upper body element 1 is formed with an outwardly projecting integral part or upper flange 13 and the lower body element 2 is formed with an outwardly and oppositely projecting part or lower flange 14. These parts 13 and 14 serve jointly to receive turnably the upper and lower end portions of a valve stem 6 which extends along the central and vertical axis of the valve assembly and in perpendicular to the axis of the fluid passage bore 12.

These projections 13 and 14 formed with central and vertical bores 13a and 14a which receive jointly the valve stem 6 having an integral circular valve wing or disc 5 covered with a protecting layer of PTFE. The practical extensions of these central bores 13a and 14a pass through the intermediate and protecting layers 4 and 3. These extensions are, however, covered with the same material of the protecting layer 3. The outer end portions 13a and 14a are closed by a headed and male-threaded plug pieces 15 and 16, respectively. The upper plug piece 15 is bored for allowing the passage of stem 6, while the lower plug piece 16 is made rigid.

To a certain predetermined depth in the valve wing 5, when measured from the outside periphery thereof, there is provided concentrically with valve stem 6, a ring recess 18 as a further extension of the said upper bore extension. In this recess, there are provided a series of vee packing rings 7, surrounding the valve stem and kept in lateral pressure contact with the vertical bore extension covered with the vertical extension of the insidemost protecting cover layer 3, and an elastic rubber or the like stopper ring 11. The stack of a number of sealing cup rings 7 is kept in position under pressure by the axial pressure force exerted downwardly thereupon through a pressurizing sleeve or bushing 8 by and from the plug or packing gland 15 which has been screw-threaded at 9.

The ring cup packings 7 are made of PTFE and each has a ridged or convex-concave cross-section.

In connection with the downwardly extending projection 14 and the corresponding vertical bore opening 14a, there are provided similar elements as denoted 8'; 11' and 18' which are similar in function and effect to elements 8; 11 and 18, respectively.

Figure 2:
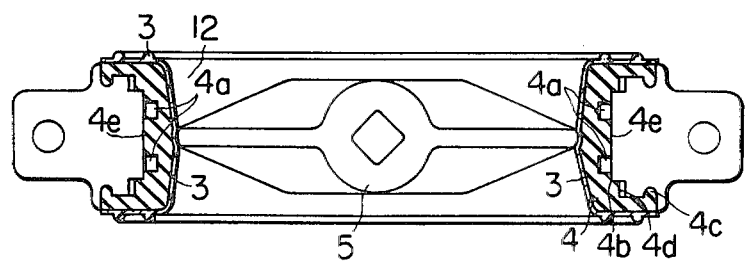
FIG. 2 is a cross-section of the butterfly valve assembly shown in FIG. 1 and taken along a section line I—I' shown therein.

Both inner corners of the material of the valve body per se A are angularly recessed as clearly shown in FIG. 2, so as to mate with respective angular projections 4b of the main body of the resilient intermediate back-up layer 4, for increasing the tight connection between the valve body per se and the said intermediate back-up layer which has a channel-shaped cross-section for surrounding substantial sectional part of the valve body per se and with exception of connection flanges 1a; 1a' and 2a; 2a'. In practice, there is provided a small idle gap 4d in each corner recess, so as to receive occasional elastic deformation of the material of the back-up layer.

Outer ends of the channel chords of the said back-up layer, as clearly seen in FIG. 2 at 4c, extend inwardly into the material of the valve body per se, the latter being formed naturally, with corresponding recesses, for further increasing the tight connection and to establish each a tongue-and-groove between the related two members.

These tongue-and-groove connections 4b; 4c, so to speak, are provided for effectively counteracting against otherwise occasionally appearing deformation in and on the resilient material consisting the back-up layer, which may be invited by the repeated rotational operation of the valve member 5, as well as substantially high fitting pressure acting between the both valve body elements 1 and 2.

At the sectional channel bottom of the back-up layer 4, there are provided two parallel ring grooves 4a which are arranged in symmetry with each other relative to the central and axial plane of the valve member 5 when seen in the closed position of the latter, as shown in FIG. 2. These ring recesses 4a have interruptions in proximity to the valve stem-passing openings (refer to FIG. 6), and these are provided for receiving resilient deformation in and on the material of the back-up layer 4, as may be invited by the flow-controlling operation of the valve member, and for increasing tight contact between the layer material and the valve body per se, especially at the inter-groove ring portion 4e of the former. The position of each of the said ring grooves 4a as measured from the center line of the valve wing or vane 5 must preferably be such that it is situated outside the sealing contact surface of the valve wing when the latter is positioned at an extremely deflected closing position, say 85 degrees or so, if the full and complete closing position is denoted with 90 degrees. On the other hand, the depth of each of the said ring grooves 4a may preferably be in the order of $\frac{1}{8}-\frac{1}{4}$ of the thickness of the back-up layer 4.

The upper and lower projections or flanges 13 and 14 of the valve assembly are formed with bolt holes 19 and 20, respectively, which serve for introducing fitting bolts for the positioning of the valve assembly in a proper pipe line and fixing it in position by tightening the respective bolts and nuts, and in the form of flange connections.

At FIG. 2, the valve assembly is shown in its fully closed position. For bringing the valve assembly into its fully open position, the stem 6 is turned by 90 degrees from the fully closed position. By positioning the valve wing or vane 5 at an intermediate position in either direction, the fluid flow can be controlled in its flow rate in the corresponding way, as is commonly known. The valve gear for the execution of such on-off flow rate control purposes may be of the conventional type and thus has been omitted from FIGS. 1–3 of the drawings only for simplicity.

Figure 3:
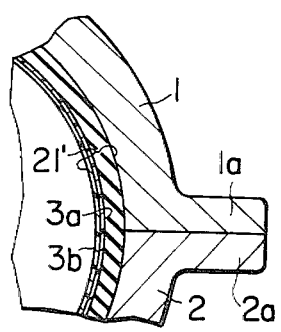
FIG. 3 is a part of the completed valve body wherein, however, the insidemost protecting layer has been modified from the foregoing so as to represent two different material layer elements.

In the modification shown in FIG. 3, numerals 1, 1a, 2 and 2a are just same as those denoted with respective same reference numerals in the foregoing and thus will not be explained at this stage.

In the present modification, the foregoing innermost protecting layer 3 has been divided into two mutually tight fit layer elements 3a and 3b. Although not shown, the valve disc is lined with PVDF. The first protecting layer elements 3a, which is to contact with the elastomer layer 4, is composed of PVDF, while the second protecting layer element 3b, which is to be exposed to the treating fluid such as gaseous chlorine, is composed of PTFE. From the foregoing, it will be clear that the valve disc and the valve body per se are effectively protected from chemical corrosion and errosion by the provision of respective PVDF-protecting layers. In addition, a smooth sliding performance between the valve disc and the valve body can be well assured by the innermost protecting layer element 3b composed of PTFE and consisting the innermost layer of the separable valve seat ring, when seen in the assembled position of the valve elements.

Finally, the second embodiment of the invention will be explained with reference to FIGS. 4 and 5. Respective members and the like which are used in the first embodiment, will be denoted the respective same reference numerals in this case, yet each being attached with a prime, for quicker identification and better understanding.

In this case, a manipulating handle 22 is fixedly attached to the top part of the valve stem 6', said handle being provided with a slidable positioning pin 23 which is shown in the fully closed position of the valve member or disc. The valve disc 5' is shown, therefore, at its fully closed position.

The enlarged top end of upper flange 13' is formed with a number of spaced openings 26 for cooperation with said pin 23 for the positioning purpose, said openings being arranged preferably to cover 45 degrees of rotational range of the handle 22 and valve stem 6'.

A small auxiliary angular shaped lever 24 is pivotably attached at its intermediate portion to the main lever 22 by a small hinge pin 25. The slidable pin 23 penetrating a depending massy portion 22a is kept normally in pressure engagement by its tip end with any selected one of said openings 26 for positioning the valve stem 6'. For this purpose, there is provided a coil spring, not shown, around the pin 23 and positioned within a hollow space, not shown, formed in the depending portion 22a of the manipulating lever, so as to resiliently urge the positioning pin righthandwards in FIG. 4. The depending end of lever 24 is shaped into a fork straddling the positioning pin 23 and behind its headed portion composed of screw nuts 27 specifically selected in this case.

Figure 4:
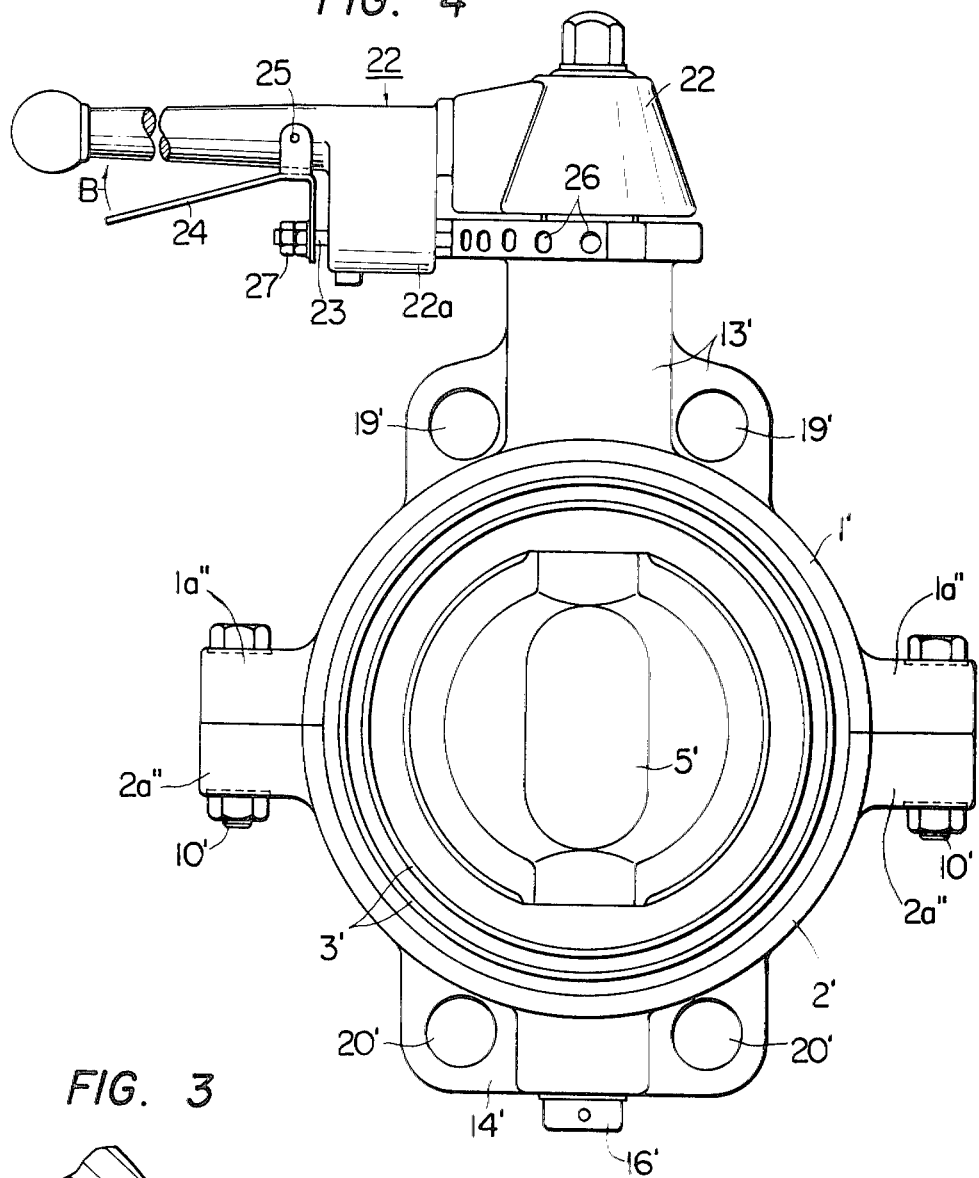
FIG. 4 is a side elevational view of the second embodiment of the invention.

When the valve member 5' is opened or closed, the both levers 22 and 24 are gripped together by the operator's hand, thereby turning the small lever 24 clockwise around pivot pin 25, so as to pull the positioning pin 23 rearwards (see arrow B in FIG. 4). Then, the main handle 22 is turned in either selected direction for closing or opening the valve, or to position the valve member to a lesser or larger opened intermediate position. By releasing the auxiliary handle, the positioning pin can be brought into engagement with any selected one of the positioning openings 26. As seen, the inner end of the handle 22 is mechanically connected with the upper end of the valve stem 6' for applying a turning torque to the latter.

The above mentioned valve operating gear may be replaced by a conventional fluid-operated actuator, an electric torque motor, a hand wheel with gearing, or the like appliances which are operatively connected with the valve stem for willful turning thereof.

The valve operating gear shown and described can be used also in the first embodiment. Other parts of the second embodiment are substantially similar to the respective parts of the first embodiment in their structure as well function so that no further detailed description may be necessary for clear understanding of the embodiment.

The valve seat member 21 is specifically shown in FIG. 6. As seen, the parallel ring grooves 4a have interruptions, so as to avoid disadvantageous connection with the valve stempassing openings formed in the seat member.

For the tight attachment of the innermost protecting layer as at 3 with the rubber back-up layer 4 is made with use of thermosettable resin. In this way, the setting of the thermosettable resin can be made simultaneous with the vulcanization of the rubber material used for the back-up layer as at 4. A preferred manner for this purpose will be set forth below.

Pulverized PVDF is first charged into a first and splittable mold and brought into hardened state so as to prefabricated into the protecting layer element as at 3.

This prefabricated product 3 is dipped in a cleaning liquor for the degreasing purpose for 2–3 minutes. The degreasing liquid may be, as an example, a mixture of 20% NaOH; $C_2H_5OH$ and $H_2O$ in the weight ratio of 20:24:56 and heated to 60–70 degrees C. Then, the prefabricated product is washed with water and dried up, and coated on its joining surface with a thermosetting agent such as "Metalock-PA", "Metalock-FB" or "Metalock-NT".

On the other hand, the back-up rubber layer is prefabricated in a second mold and taken out therefrom and then degreased with methanol. The rubber material is unvulcanized one.

Then, the both semi-products are placed jointly in a third mold and subjected to heat and pressure for about 20 minutes at 5–50, preferably 10 kg/cm², and 150–155 degrees C. In this way, an intimately jointed and unitary valve seat member as at 21 can be provided and the heat-setting job and the vulcanizing job may be executed simultaneously which represents naturally a progress in the art.

The embodiments of the invention in which an exclusive property or privilege is claimed are as follows:

1. A butterfly valve assembly comprising a stationary valve body having an axial fluid flow passage therethrough, a turnable valve member having a valve stem fixed thereto adapted for full opening, partial opening and full closing of said flow passage, and a valve seat ring having an inner protecting resin layer comprising a first layer of polyvinylidene difluoride and a second layer of polyethylene tetrafluoride covering said first layer, and an outer back-up layer of elastomer, said back-up layer having a channel shaped cross-section defining chords fitted onto said valve body and said back-up layer including ring groove means on the radially outward surface thereof for permitting resilient structural deformation of said back-up layer, wherein said valve seat ring includes holes therein with said valve stem passing therethrough and said ring groove means are interrupted by said holes in said valve seat ring.

2. The butterfly valve assembly of claim 1 wherein said valve body includes recesses therein and the chords of said channel are oppositely positioned and extend inwardly at the ends of each channel chord into the recesses of said valve body, thereby forming a tongue-and-recess connection between the valve body and the back-up layer, when the valve seat ring is attached to the valve body.

3. The valve assembly as set forth in claim 2 including an idle gap in each of the inner corners of said channel for receiving occasional and radial physical deformation of the back-up layer caused by repeated operation of the valve member.

4. The valve assembly as set forth in claim 1 including an idle gap in each of the inner corners of said channel for receiving occasional and radial physical deformation of the back-up layer caused by repeated operation of the valve member.

5. The valve assembly as set forth in claim 1 wherein said first and second layers are adhered together with a thermosetting resin which has been hardened under heat and pressure simultaneously with vulcanization of the elastomer layer of said back-up layer.

* * * * *